A. V. WINEGARDEN.
MECHANICAL MOVEMENT.
APPLICATION FILED MAY 14, 1920.
1,381,046.
Patented June 7, 1921.
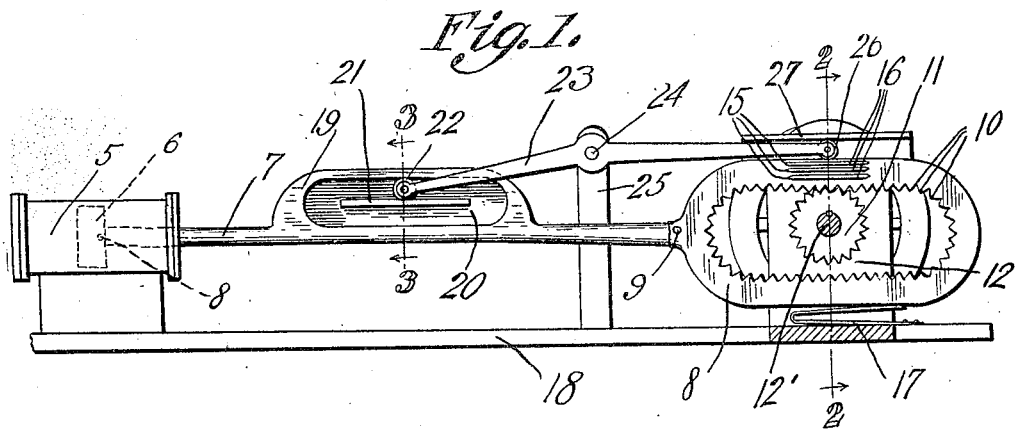
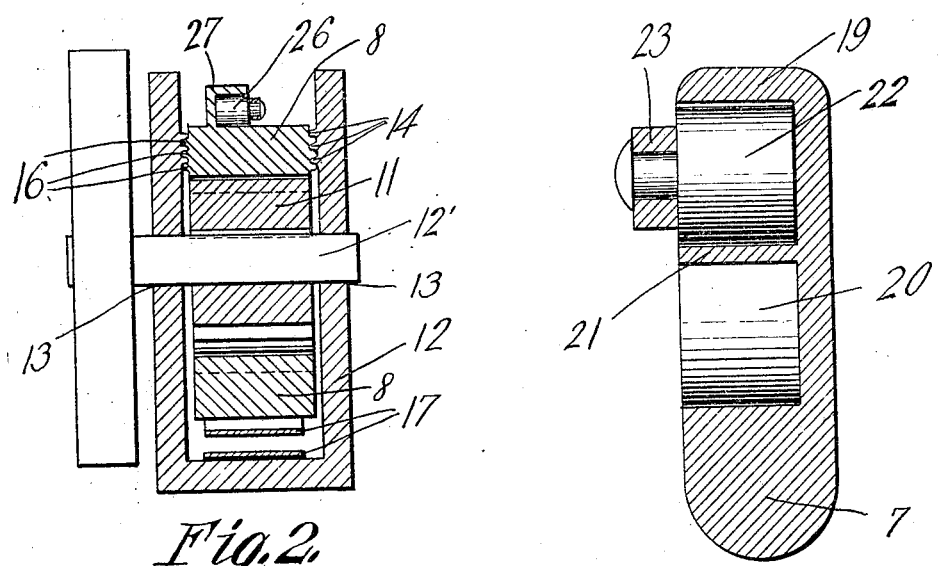
A. V. Winegarden,
Inventor
Witness
By
Attorneys

UNITED STATES PATENT OFFICE.

AREY V. WINEGARDEN, OF WICHITA, KANSAS.

MECHANICAL MOVEMENT.

1,381,046.     Specification of Letters Patent.     Patented June 7, 1921.

Application filed May 14, 1920. Serial No. 381,338.

*To all whom it may concern:*

Be it known that I, AREY V. WINEGARDEN, a citizen of the United States, residing at Wichita, in the county of Sedgwick and State of Kansas, have invented a new and useful Mechanical Movement, of which the following is a specification.

This invention relates to mechanical movements, and more particularly to a novel form of piston rod to be employed in connection with gas or steam engines for converting reciprocating motion into rotary motion or vice versa.

A further object of the invention is to eliminate the dead center in the operation of the device, thus reducing the shock or jar usually directed to the connecting rods, caused by the explosions in the cylinders of the engine, to a minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 illustrates a side elevational view of a device constructed in accordance with the present invention.

Fig. 2 illustrates a sectional view taken on line 2—3 of Fig. 1, and

Fig. 3 illustrates a sectional view taken on line 3—3 of Fig. 1.

Referring to the drawing in detail, the reference character 5 designates the cylinder of an engine, having the piston 6 operating therein, which piston 6 is provided with a supporting or piston rod 7 having pivotal connection therewith, as at 8'.

The opposite end of the piston rod 7 has connection with the yoke 8 through the medium of the pivot pin 9 which is disposed substantially intermediate the side edges of the yoke, and at one end thereof.

Disposed on the inner surface of the yoke 8 is a rack including the teeth 10, which teeth are continuous around the inner surface of the yoke 8 and in mesh with the teeth of the pinion 11 supported on the driven shaft 12', which has connection with a machine to be operated, in any suitable manner.

A supporting frame includes frame standards 12, which are spaced to provide opposed bearings 13 for the shaft 12', so that reciprocating movement imparted to the yoke 8 will be transmitted to the driven shaft 12' through the pinion 11, keyed or otherwise secured thereto.

Horizontally disposed flanges 14 are provided on the standards 12, the flanges being disposed in spaced relation with each other to provide guideways therebetween, and as shown the ends of each of the flanges are tapered as at 15 for reasons to be hereinafter more fully described. Coöperating with the flanges 14, are the horizontally disposed flanges 16, which extend laterally from the side faces of the yoke 8, these flanges being also disposed in spaced relation with each other to provide guideways therebetween to accommodate the flanges 14 supported on the standards 12, and since these flanges 16 are relatively long, it will be seen that the flanges of the standards and the flanges of the yoke do not disengage each other until the yoke has reached the limit of its movement in either direction.

From the foregoing it will be seen that the weight of the yoke, when the device is in operation, is supported by the flanges 14 and 16, thereby relieving the pinion 11 and the operated shaft 12' of the weight of the yoke to the end that the pinion 11 and its shaft may be operated with a minimum amount of power.

In order that the teeth of the rack will be maintained in engagement with the teeth of the pinion 11, a substantially large leaf spring member indicated at 17 is disposed under the yoke 8, one arm thereof being secured to the base 18, on which the standards are supported, the opposite arm thereof, contacting with the under surface of the yoke to urge the same upwardly.

Supported on the piston rod 7, by suitable means, is a bracket member 19 which is provided with an elongated opening 20 divided throughout a portion of its length by means of the rib 21 to provide a track-way for the roller 22, which is carried by one end of the arm 23, forming the equalizing structure to insure the efficient operation of the device.

This arm 23 is relatively long, and is pivoted at a point intermediate its ends as at 24, to the standard 25, which is also secured to the base 18 in an upright position, the opposite end of said arm 23 supporting the roller 26, which operates in the guideway 27 provided on the upper surface of the yoke 8.

From the foregoing it will be apparent that when the roller 22 moves in the trackway formed in the elongated opening, the yoke 8 is moved longitudinally of the standards 14 and 16 to the end that the teeth of the rack are held into engagement with the teeth of the pinion 11, whereby reciprocatory movement of the yoke is transmitted to the pinion 11 to accomplish the rotation of the driven shaft 12'.

In the operation of the device, when the roller 22 moves from the upper portion of the track-way in which the same operates to the lower portion thereof, the roller 26 carried at the opposite end of the arm 23 moves upwardly bringing the lower teeth of the rack into engagement with the pinion 11 to cause a continuous rotation of the pinion and its shaft.

Having thus described the invention, what I claim as new is:—

1. In combination with a reciprocating piston rod, a yoke supported at one end of the piston rod, said yoke having internal teeth, standards, a shaft operating in the standards and having a pinion in mesh with the internal teeth of the yoke, means for supporting the weight of the yoke, means for moving the yoke longitudinally of the standards, spring means coöperating with the yoke for normally urging the yoke upwardly, and means for positively operating the yoke moving means.

2. In combination with a reciprocating piston rod, a yoke having connection with one end of the piston rod, said yoke having a rack, a pinion in mesh with the rack for receiving motion therefrom, a standard supported adjacent the yoke, an arm pivotally supported by the standard, a bracket on the piston rod, said bracket having track-ways formed therein, a roller on one end of the arm operating in the track-way, the opposite end of said arm having connection with the yoke for moving the yoke vertically when the roller moves in the track-way, and means for supporting the yoke.

3. In combination with a reciprocating piston rod, a yoke having connection with one end of the piston rod, standards associated with the yoke, a shaft supported by the standards and carrying a pinion, said yoke having a rack coöperating with the pinion for transmitting rotary motion to the pinion, and its shaft, a rocking arm, said arm having one of its ends connected to the yoke, means coöperating with the opposite end of the arm for rocking the arm to cause the vertical movement of the yoke, and means carried by the yoke for supporting the weight thereof.

In testimony that I claim the foregoing as my own, I have hereto affixed my signature in the presence of two witnesses.

AREY V. WINEGARDEN.

Witnesses:
  I. LESEM,
  C. G. OVERMYER.